US007854967B2

(12) United States Patent
Keener et al.

(10) Patent No.: US 7,854,967 B2
(45) Date of Patent: Dec. 21, 2010

(54) METHOD FOR PRE-SEALING FAYING SURFACES OF COMPONENTS AND FAYING SURFACES PRE-SEALED THEREBY

(75) Inventors: Steven G. Keener, Trabuco Canyon, CA (US); Norman R. Byrd, Villa Park, CA (US)

(73) Assignee: The Boeing Company, Chicago, IL (US)

( * ) Notice: Subject to any disclaimer, the term of this patent is extended or adjusted under 35 U.S.C. 154(b) by 1208 days.

(21) Appl. No.: 10/981,000

(22) Filed: Nov. 4, 2004

(65) Prior Publication Data

US 2005/0112285 A1 May 26, 2005

Related U.S. Application Data

(60) Continuation-in-part of application No. 10/287,377, filed on Nov. 4, 2002, now abandoned, which is a division of application No. 09/578,144, filed on May 24, 2000, now Pat. No. 6,475,610, which is a division of application No. 09/151,343, filed on Sep. 11, 1998, now abandoned.

(51) Int. Cl.

| | |
|---|---|
| ***B05D 5/00*** | (2006.01) |
| ***B05D 7/14*** | (2006.01) |
| ***B05D 7/24*** | (2006.01) |
| ***B05D 1/36*** | (2006.01) |
| ***B05D 3/02*** | (2006.01) |
| *B32B 7/02* | (2006.01) |

(52) U.S. Cl. .................... 427/407.1; 427/409; 427/410; 427/384; 427/388.1; 106/14.05; 106/15.05

(58) Field of Classification Search .............. 427/407.1, 427/409, 384, 388.1–388.5, 410; 106/14.05, 106/15.05
See application file for complete search history.

(56) References Cited

U.S. PATENT DOCUMENTS

| | | | | |
|---|---|---|---|---|
| 2,605,185 | A | | 8/1953 | Larson et al. |
| 3,855,044 | A | | 12/1974 | Riel |
| 3,950,204 | A | | 4/1976 | Williams |
| 3,971,873 | A | | 7/1976 | Price |
| 3,979,351 | A | * | 9/1976 | Sekhon ....................... 524/217 |
| 3,996,308 | A | | 12/1976 | Douek et al. |
| 4,310,390 | A | | 1/1982 | Bradley et al. |
| 4,405,427 | A | | 9/1983 | Byrd |
| 4,515,919 | A | | 5/1985 | Bradley et al. |
| 4,588,838 | A | | 5/1986 | Byrd |
| 4,659,268 | A | | 4/1987 | Del Mundo et al. |
| 4,717,302 | A | | 1/1988 | Adams et al. |

(Continued)

FOREIGN PATENT DOCUMENTS

EP 0 547 379 A2 6/1993

(Continued)

*Primary Examiner*—William Phillip Fletcher, III
(74) *Attorney, Agent, or Firm*—Alston & Bird LLP

(57) ABSTRACT

A method for preparing and treating the surfaces of structural components, such as structural aircraft wing and fuselage skin panels, spar, spar assemblies, ribs, stiffeners, hinges, doors, etc., and the mechanical components attached to these aforementioned structural components, with a semi-permeable, corrosion-inhibiting organic coating. The method being particularly applicable for the improved sealing process of the faying surfaces of these aircraft components.

27 Claims, 2 Drawing Sheets

U.S. PATENT DOCUMENTS

| | | | | |
|---|---|---|---|---|
| 4,778,637 | A | 10/1988 | Adams et al. | |
| 4,861,211 | A | 8/1989 | Dunsmore | |
| 4,910,086 | A | 3/1990 | Kawakami et al. | |
| 5,213,639 | A * | 5/1993 | Colvin et al. | 148/693 |
| 5,496,784 | A | 3/1996 | Byrd | |
| 5,576,065 | A * | 11/1996 | Gaveske | 427/407.1 |
| 5,614,037 | A * | 3/1997 | Keener | 148/537 |
| 5,858,133 | A | 1/1999 | Keener | |
| 5,922,472 | A | 7/1999 | Keener | |
| 5,944,918 | A | 8/1999 | Keener | |
| 6,013,698 | A | 1/2000 | Lupton et al. | |
| 6,133,371 | A | 10/2000 | Philipson | |
| 6,171,649 | B1 | 1/2001 | Keener et al. | |
| 6,221,177 | B1 | 4/2001 | Keener | |
| 6,274,200 | B1 | 8/2001 | Keener et al. | |
| 6,403,230 | B1 | 6/2002 | Keener | |
| 6,494,972 | B1 | 12/2002 | Keener et al. | |
| 6,499,926 | B2 | 12/2002 | Keener | |
| 6,638,381 | B2 | 10/2003 | Keener et al. | |

FOREIGN PATENT DOCUMENTS

| | | |
|---|---|---|
| EP | 0 602 819 | 6/1994 |
| EP | 0 785 243 A2 | 7/1997 |
| WO | WO 96/34993 | 11/1996 |
| WO | WO 98/13148 | 4/1998 |

* cited by examiner 1
2
3
4
5
6
7
8

METHOD FOR PRE-SEALING FAYING SURFACES OF COMPONENTS AND FAYING SURFACES PRE-SEALED THEREBY

CROSS-REFERENCES TO RELATED APPLICATIONS

This application is a continuation-in-part of U.S. patent application Ser. No. 10/287,377 filed on Nov. 4, 2002, now abandoned, which is a division of U.S. application Ser. No. 09/578,144, filed on May 24, 2000, now U.S. Pat. No. 6,475,610, which is a division of U.S. patent application Ser. No. 09/151,343, filed on Sep. 11, 1998, now abandoned, which are hereby incorporated herein in its entirety by reference.

BACKGROUND OF THE INVENTION

This invention relates to the preparation of coated or pre-sealed components and their installation and assembly. More specifically, the present invention relates to pre-treating or pre-sealing surfaces of aircraft structural components with a layer of sealant material.

It has recently been discovered that the corrosion protection and ease of processing and assembly of certain, aircraft structural components can be improved by pre-treating the components with an organic, corrosion-inhibiting coating material prior to installation. It had been the conventional practice to coat or seal such components with wet sealants that are known to require extensive and expensive special handling, especially with respect to their disposal. The pre-treatment or pre-coating method obviates the need and use of the wet sealants, reducing processing time and disposal costs.

According to an exemplary pre-treatment process, it has been the practice to pre-coat some types of fasteners in aircraft assemblies with organic phenolic coating materials to protect the base metal of the fasteners and surrounding adjacent structure against corrosion damage. In this usual approach, the fastener is first fabricated and then heat-treated to its required strength. After heat-treatment, the fastener is etched with a caustic soda bath or otherwise cleaned to remove any scale produced in the heat-treatment. The organic phenolic coating material, dissolved in a volatile carrier liquid, is applied to the fastener by spraying, dipping, or the like. The carrier liquid is allowed to evaporate. The coated fastener is then heated to an elevated temperature for a period of time to cure the phenolic coating; typically one hour at 400° F. The finished fastener is then ready to be used in the assembly of the airframe structure. Alternatively, the heat-treatment step and curing step can occur simultaneously. The details of these process methods are contained in U.S. Pat. Nos. 5,614,037, 5,858,133, 5,922,472, 5,944,918, 6,221,177, 6,274,200, and 6,403,230.

Because sealant materials are typically used at the interface of mating or faying surfaces between components that are to be assembled and must be rendered air-tight, water-tight, or fuel-tight, the sealant materials used to coat or pre-coat the faying surface of the components prior to assembly are desirably impermeable. Exemplary organic polyurethane sealant materials, such as those disclosed in U.S. Pat. Nos. 6,133,371, 6,315,300, and 6,499,745 are considered to be impermeable.

Impermeable sealant materials may be used with success but the restriction of only using impermeable sealant materials means that the choice of sealant materials might be inadvertently or unduly limited (i.e., not actually required for real-world application) and does not necessarily include those sealant materials with other superior properties, such as resistance to deterioration, resistance to solvent attack, and resistance to elevated or depressed temperatures. Such limitations are undesirable and unreasonable since it is equally as desirable to provide sealant materials with improved resistance to deterioration, resistance to solvent attack, and resistance to elevated or depressed temperatures other than the impermeable sealant materials currently available.

SUMMARY OF THE INVENTION

It has now been discovered that the surfaces of structural parts can be pre-treated with faying-surface sealant materials that are semi-permeable, i.e. about 0.3 perm to about 1.5 perms, in order to facilitate and enhance processing and assembly of the structural components while improving corrosion protection, reducing or eliminating cleaning and other processing steps and maintaining sufficient sealing against fluid migration through the sealant material layer.

The present invention provides a method for preparing and treating the faying surfaces of structural components such as structural aircraft wing and fuselage skin panels, spars, spar assemblies, ribs, stiffeners, hinges, doors, etc., and the mechanical components attached to these aforementioned structural components. In addition, the present invention is particularly applicable for the improved processing of the faying surfaces of these aircraft components. The application of the sealant material coating utilizing this method does not either alter or affect the mechanical or metallurgical properties or performance of the components and does not adversely affect the desired, final performance of the assembled aircraft structure.

In accordance with the preferred embodiment, the present invention comprises a method for preparing a structural component providing a metallic or non-metallic substrate precursor and coating the precursor with a semi-permeable organic coating material. The coated, pre-sealed components are allowed to remain under ambient, room temperature conditions so as to facilitate the cure of the coating material.

In another embodiment, the present invention comprises providing a structural component and coating the component with a semi-permeable organic coating material. The coated, pre-sealed component is subjected to an elevated or room temperature to cure the coating material.

In a further embodiment, the present invention comprises providing a metallic component following solution heat-treatment that is not in its final heat-treated state. A semi-permeable organic coating material is applied to the component, followed by precipitation heat-treating the coated component that simultaneously cures the organic coating material.

In a still further embodiment, the present invention contemplates providing a component. A first or base coating material layer is applied to the component optionally followed by applying an encapsulated, second coating material layer, wherein the first and/or second coating material is semi-permeable. The component is then contacted to another component for final assembly. The coated component is then compressed against a second structural component in its final assembly position. The compression force exerted during the assembly of the components is sufficient to rupture the adhesive encapsulations contained in the second coating material. The second coating material layer reacts between the first coating material layer and the adjacent, second structural component to produce and enhance the overall adherence of the surface of the first component with that of the second component. The second coating material provides an enhanced bond between the faying surfaces of the two structural components.

A protective release paper designed to protect the coated component is optionally applied to the surface of the coated component after which the component may be placed into assembly ready position and the protective release paper removed to expose the coated components. Once the release paper has been removed, the coated component is ready for assembly with its mating component.

Without the limitation of having to create an impermeable faying-surface seal, the selection of faying-surface sealant materials increases dramatically and sealant materials, which exhibit relatively superior characteristics, such as resistance to deterioration, resistance to solvent attack, and resistance to elevated or depressed temperatures, may be used. By pre-coating the components prior to installation, equivalent or improved sealing is achieved in comparison to similar un-coated components that are either coated only after installation or that employ the use of wet-sealant material that is applied prior to their assembly.

The permeability of the sealant coating material facilitates the improved ability to protect a component by both barrier protection, and inhibition. The semi-permeable coating material employs a combination of these two methods to protect the components' faying surfaces. As a barrier, the coating material provides protection by blocking or minimizing the passage of moisture, oxygen, and/or other reactive chemicals from reaching the substrate material. Additionally, the coating material protects the substrate material by inhibition with special corrosion-inhibiting pigments that inhibit or interfere with the corrosion reactions of the substrate material's surface. As moisture or other reactive solutions or compounds pass through the coating material layer, the anti-corrosive pigments in the semi-permeable coating material slowly dissolve and aid in halting or minimizing corrosive action. In addition, by incorporating non-leachable anti-microbial additives, the coating material can offer long-term corrosion protection while protecting the substrate from microbiologically influenced corrosion activity.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figures 1A, 1B, 1C, 1D, 1E, 1F, 1G:
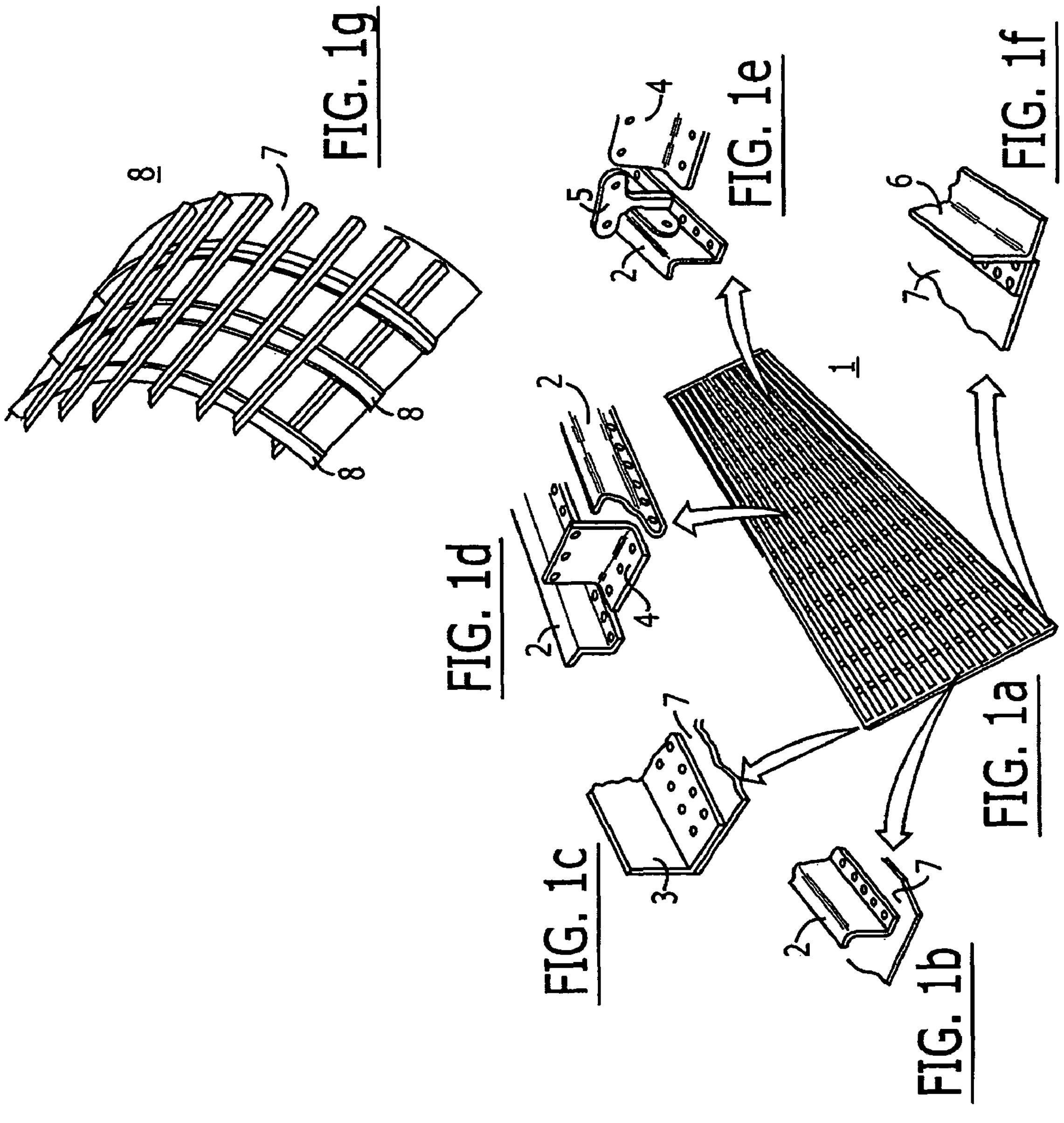
FIG. 1*a* shows a wing panel sub-structure.
FIGS. 1*b*-1*f* show enlarged partial views of component aspects of the wing panel where faying surfaces occur.
FIG. 1*g* shows a section of fuselage skin attached to a frame section; and, FIG. 2 is a process flow diagram for a method of the invention using a naturally or artificially-aged alloy and curing of at least one layer of coating material using elevated temperature conditions.

The substrates and components contemplated by the present invention often will be metal sheets or flanges, formed of aluminum-alloy, titanium-alloy, or steel materials but may also be composite structures including but not limited to epoxy/carbon composites. The identity of the substrates and components are not limitations on the invention, but are given only as illustrative examples of the uses to which this invention can be put.

While a layer of sealant material can be applied at pre-assembly to adjacent, mating surfaces, this will usually be an unnecessary duplication of labor. Further, if a layer of sealant material is applied to both surfaces, each may be thinner than the single layer of sealant material applied to only one surface. It is understood that, in the event that the sealant material layers are deposited on the surfaces of components that are to be assembled, each layer will be contiguous to and adherent to its own respective component's surface. After assembly, the exposed surface of each sealant material layer will conform to the exposed surface of the other layer of sealant material to complete the seal, instead of conforming to the other component's faying surface. This construction, while not preferred, is within the scope of this invention. It is in the nature of the sealant material layer(s) to make a closed, and preferably compressive seal having no gaps or voids. While the previously exposed surfaces of the sealant material will not ordinarily fuse with each other, their mutual resistance to flow and common deformability will assure a fluid-tight seal between them.

When only one layer of sealant is used on only one of the mating component's faying surfaces, the sealant adheres to its respective surface, and is pressed against the other component's faying surface as a result of the assembly procedures. The cured, previously applied sealant material is pliable but resists cold flow. The pre-applied sealant feels slightly soft to the touch, preferably having a Shore A hardness between about 30 and about 70. This feature aids in maintaining a prevailing sealing force. For example, in modern assembly and joining practices in the aircraft industry, the sealant material will usually be compressed between the substrates of the mating components. When fasteners are subsequently installed, the resulting clamp force exerted by the installed fasteners will maintain a prevailing compressive force on the mating components and consequently on the faying-surface sealant material.

The polyurethane coating material is an organic polymeric coating made from the reaction of isocyanate-rich and polyol-rich compounds. Polymerization is made possible by using di- and poly-functional isocyanates and polyols. Further, there is no by-product from the reaction between isocyanates and alcohols. This is important in terms of cost-effectiveness and health risk.

Polyurethanes cure to a safe, inert product. The polyols used for polyurethane formation may be derived from natural products such as sucrose, glycerol, or ethylene glycol, among others, and hence are not classified as hazardous substances; or from higher molecular weight polyols, in which case they would be used for crosslinking purposes. Thus, in order to achieve a polymer with useful properties, the polyol has to be at least difunctional and usually in a molecular weight range of from about 400 to about 4000. This would govern the degree of flexibility (high molecular weight polyol) to stiffness (low molecular weight polyol). In addition, using polyols with a functionality greater than 2 would govern the extent of crosslinking necessary to enhance physical properties and chemical resistance.

The diisocyanates used in the preferred coating material formulation are either monomers or pre-polymers, which means that the diisocyanate monomer is reacted with a small amount of polyol to produce a larger, less volatile and less hazardous polymer. Similarly, the isocyanate, used as a diisocyanate, may be aliphatic, such as hexamethylene diisocyanate, or cycloaliphatic, such as cyclohexyl diisocyanate-1,4 or -1,3 or -1,2, or aromatic, such as toluene-2,4-diisocyanate or methylene diphenyl diisocyanate, or polymeric diisocyanate (from polyether or polyester). Generally, these are in the range of about 164 molecular weight to about 3000 molecular weight. Furthermore, polyisocyanates (functionality greater than 2) may also be used for crosslinking.

Finally, since polyurethanes are made by reaction between two low viscosity liquids, there is little need for solvents in the system. If there is a need to thin a coating, reactive diluents may be used, which provide the ability to reduce viscosity, like solvents, while also undergoing reaction with the polymer.

Each of the requisite properties of the sealant material, both before and after curing, has a substantial range of acceptability. The task of designing the sealant material formulation therefore becomes one of providing it with each of the properties within the acceptable range. Evidently, there can be at least several sealant compositions whose properties will fall within the selected limit ranges. Any of these can be used, but the selection among them will often be determined by their convenience in formulation and use, and in minimized requirements for control of environmental conditions during mixing and application, and of course minimum toxicity. Although other systems are useful and acceptable, generally the urethanes will be much preferred.

As design (selection) or formulation criteria for permeability, solvent resistance, resistance to cold flow under the anticipated temperature conditions, and proper hardness, a suitable amount of cross-linking is necessary. However, if the cross-linking is too great, the cured material will be too hard and brittle for use. If there is insufficient cross-linking there will be insufficient resistance to solvents, cold flow, or general forces generated or exerted during normal operating conditions.

In order to formulate a sealant with the desirable properties as described above it is necessary to strike a proper balance between the amount of cross-linking of the final polymer and the chain lengths between cross-links in the backbone of the molecule. Too much cross-linkage leads to hard, brittle polymers with insufficient flexibility to perform the required sealing as described above. Too little cross-linking leads to polymers that show poor solvent and chemical resistance as well as poor resistance to cold flow or creep.

Cross-linking is attained in polyurethanes by using multi-functional monomeric starting materials (isocyanates or polyols). In this case, "multi-functional" is defined as a functionality level greater than two. In order to produce a long chain polymer, both the isocyanate and polyol materials must have a functionality of at least two.

In addition to sufficient cross-linking, the choice of chain length is important for the properties of softness and flexibility. It is understood that if long chain monomers are used to provide softness and flexibility, such monomers must be highly functional. If shorter chain monomers are used, the functionality can be decreased, but there still must be sufficient chain length for the cured sealant material to have the desired pre-determined physical properties.

There are many possible routes to producing a polymer with the correct balance or cross-linking and chain length. For example long chain diols can be cross-linked with suitable amounts of short chain triols (or tetraols, etc.). Conversely long chain triols can be used to cross-link short or medium chain length diols.

With the foregoing in mind, the formulator of sealants according to this invention will select appropriate chain lengths and functionalities, and mix the reactants prior to application, or mix them as they are being applied, perhaps in a spray gun.

Adjustments to the various properties may be made by selecting longer or shorter chains of polyol or diisocyanate, ranging from about 400 to about 4,000 for the polyol and about 150 to about 3,000 for the diisocyanate to result in a finished polyurethane coating material of molecular weight ranging from about 1,500 to about 50,000 with a preferred range of about 5,000 to about 25,000, depending upon the desired hardness with further contributions being made by the functionalities of the reactants. A polyurethane with a range of molecular weight from about 1,500 to about 25,000 is desired, with a preferred range being about 5,000. Additives for various purposes may be including in the pre-cured mix, for example corrosion resistant compounds and catalysts.

Material formulations according to this invention may preferably use any of a number of different chromates for corrosion resistance. Strontium, barium, and zinc chromates are particularly preferred. The coating material preferably has a total chromate content by weight of from about 0% to about 6%, and most preferably from about 3% to about 6%. Borates, preferably zinc borate, are also preferably used for this purpose. Zinc borate in amounts between about 3% and 30% by weight of the formulation is useful. Its preferred range is between about 6% and about 12% by weight. Percentages less than about 6% are useful, but at least that amount is to be preferred. Amounts above about 12% do not appear to offer enough greater effect to justify their use. About 6%-8% will generally be selected within the preferred range.

Conventional catalysts may be used. Organic metal salts, especially salts of tin, and mercury are frequently used. Amines are also useful catalysts. Tertiary amines provide for a fast cure that is difficult to control. Secondary amines do not result in a fast cure and are well regarded for the purpose. The most commonly used amine catalysts are primary amines. Any corrosion resistant additive and any catalyst that is not deleterious to the composition is within the scope of this invention, the above being merely the preferred examples.

With the foregoing in mind, the following illustrative examples of coating polymers are given. The preferred polymer system is a polyurethane material. The various polyols can be obtained as urethane grade materials from a variety of suppliers. Table 1 shows a few examples of some of the commercially available materials. This table is not intended to be complete, but only shows a sample of the wide variety of available materials.

TABLE 1

| Product Name | Supplier | Functionality (Type) | Approx. Mol. Wt. |
|---|---|---|---|
| Multranol 9121 | Bayer | 2 (diol) | 425 |
| Poly G 20-265 | Olin | 2 (diol) | 425 |
| Poly G 20-112 | Olin | 2 (diol) | 1000 |
| Multranol 9109 | Bayer | 2 (diol) | 1000 |
| Multranol 3600 | Bayer | 2 (diol) | 2004 |
| Poly G 20-56 | Olin | 2 (diol) | 2000 |
| Poly G 20-28 | Olin | 2 (diol) | 4000 |
| Multranol 9195 | Bayer | 2 (diol) | 4000 |
| Multranol 9133 | Bayer | 3 (triol) | 160 |
| Poly G 70-600 | Olin | 3 (triol) | 282 |
| Poly G 30-280 | Olin | 3 (triol) | 615 |
| Multranol 9157 | Bayer | 3 (triol) | 673 |
| Multranol 9144 | Bayer | 3 (triol) | 1122 |
| Poly G 30-168 | Olin | 3 (triol) | 1000 |
| Poly G 30-112 | Olin | 3 (triol) | 1500 |
| Multranol 9180 | Bayer | 3 (triol) | 1503 |
| Multranol 9187 | Bayer | 3 (triol) | 2805 |
| Poly G 30-56 | Olin | 3 (triol) | 3000 |
| Poly G 30-42 | Olin | 3 (triol) | 4000 |
| Multranol 9168 | Bayer | 3 (triol) | 3740 |
| Multranol 9181 | Bayer | 4 (tetraol) | 291 |
| Multranol 9173 | Bayer | 5.5 | 671 |
| Multranol 9185 | Bayer | 6 | 3366 |

The above products are well-known. Their features, which are important to this invention, are shown in the foregoing table. “Bayer” refers to Bayer Corporation, 100 Bayer Road, Pittsburgh, Pa. 15205-9741. “Olin” refers to Olin Industries.

By combining the proper mixture of high and low molecular weight polyols, and by using a variety of ratios of diols to polyols with functionalities greater than 2, a variety of urethane polymers with different degrees of cross-linking and various physical properties can be obtained. For example backbone chains prepared from high molecular weight diols (to give flexibility) can be cross-linked with low molecular weight triols to result in urethane polymers with the desired physical properties and chemical resistance. Conversely, lower molecular weight diols can be cross-linked with higher molecular weight triols and/or tetraols to also obtain a desirable combination of properties.

The above discussion has concerned ways of formulating polyurethanes with the desired properties by the proper choice of hydroxy compounds. By selecting the proper polyisocyanate, an equally powerful method of obtaining a variety of properties can be produced. However, in practice the properties of the polymer are generally determined by the choice of hydroxyl compounds, and the isocyanates are chosen for other considerations.

It has been found that in general the strongest but least flexible polymers result when aromatic isocyanates are used for their preparation. Conversely, more flexible but less heat resistant polymers result when aliphatic isocyanates are used for their preparation. Intermediate properties are obtained when cycloaliphatics are used. Even more important than the influence of physical properties by the isocyanates is the resistance to yellowing and weathering when the polymers are exposed to ultra violet radiation such as occurs in normal outdoor exposure. Polyurethanes prepared from aromatic isocyanates show poor resistance to weathering and yellowing whereas those prepared with aliphatic or cycloaliphatic isocyanates exhibit good weathering characteristics.

It is preferred that the isocyanates be provided in their polymeric form. Polymeric isocyanates have reduced volatility and are safer to handle. Polyisocyanates are commercially available as are isocyanate-terminated prepolymers. These materials can be used as substitutes for all or part of the monomeric isocyanates for the preparation of polyurethanes.

As with the hydroxy compounds, isocyanate materials especially manufactured for the preparation of polyurethanes are commercially available from a variety of manufacturers. A few of the suitable materials available from Bayer are listed below.

Mondur ML: Aromatic monomeric diisocyanate.

Mondur TDS: Aromatic monomeric diisocyanate.

Desmodur W: Cycloaliphatic monomeric diisocyanate.

Mondur MR: Aromatic polymeric diisocyanate.

Baytec ME-040: Isocyanate terminated polyether prepolymer.

Baytec ME-090: Isocyanate terminated polyether prepolymer.

Baytec ME-041: Isocyanate terminated polyester prepolymer.

Baytec WE-180: Isocyanate terminated aliphatic prepolymer.

In addition the aliphatic hexamethylene diisocyanate can be purchased commercially.

The foregoing isocyanates and polyols may be obtained from the Bayer Corporation. Further information regarding them will be found in its publication entitled “Polyurethane Raw Materials Product Index—Polyurethane Products”, copyright 1996, which is incorporated herein in its entirety in this invention for such information, and a copy is being filed along with this application.

The general method for formulating practical polyurethanes is to first choose the isocyanate portion of the composition based first on the requirements of resistance to weathering and then on the other factors such as cost, toxicity, method of application of the final composition etc. Once the isocyanate has been chosen, the desirable physical properties of the final polymer are obtained by the proper choice of the hydroxy components as described above. Using multiple functional groups for increasing the density of cross-linking causes a decrease in elongation, solubility, and permeability.

The following are examples of suitable formulation of polyols and isocyanates together with other ingredients, which when mixed will cure to form a useful sealant according to this invention in a suitable period of time. Examples 1-6 are urethane systems, with percentages given by weight. The polyols and isocyanates are more completely described in the foregoing lists. DBTDL identifies dibutyl tin dilaurate, which is provided as a catalyst.

| | |
|---|---|
| Poly G 20-56 | 38.85% |
| Multranol 9109 | 38.85% |
| Mondur MR | 16.3% |
| DBTDL | 0.01% |
| Zinc Borate | 6% |

| | |
|---|---|
| Poly G 20-56 | 70.7% |
| Poly G 70-600 | 6.7% |
| Mondur FL | 18.6% |
| DBTDL | 0.01% |
| Zinc Borate | 4.0% |

| | |
|---|---|
| Multranol 9109 | 47.1% |
| Poly G 30-280 | 19.3% |
| MRS-4 | 25.6% |
| DBTDL | 0.01% |
| Zinc Borate | 8% |

| | |
|---|---|
| Multranol 9195 | 76.8% |
| Multranol 9133 | 4.1% |
| Mondur MR | 16.1% |
| DBTDL | 0.015% |
| Zinc Borate | 3% |

| | |
|---|---|
| Poly G 20-56 | 44.8% |
| Multranol 9185 | 25.1% |
| MRS-4 | 12.1% |
| DBTDL | 0.01% |
| Zinc Borate | 18% |

| | |
|---|---|
| Desmophen 2000 | 42.5% |
| Multranol 9144 | 31.7% |
| Desmodur W | 19.8% |
| DBTDL | 0.02% |
| Zinc Borate | 6% |

A number of curable, semi-permeable organic coating materials are available and may be used in the present process. A preferred coating material of this type comprises resin mixed with one or more plasticizers, other organic components such as polytetrafluororoethylene, and inorganic additives such as aluminum powder and/or chromates, such as strontium chromate, barium chromate, zinc chromate, and the like.

One such preferred semi-permeable curable organic sealant material is Hi-Kote F/S1™, generally referred to as simply Hi-Kote F/S, produced by the Hi-Shear Corp. (Torrance, Calif.). Alternatively, non-chromated sealant materials may be used, such as coatings containing zinc borate. These coating materials are preferably dispersed in a suitable solvent present in an amount to produce a desired consistency depending upon the application selected. The solvent may be an ethanol mixture but preferably is an aqueous medium. Phenolics, urethanes (including polyurethanes and ureas), epoxies, melamines, acrylates, and silicones are representative examples of the preferred encapsulated adhesives in the second coating. A preferred sealant material for use as the optional second coating is the polyurethane/urea-based Hi-Kote F/S2 produced by the Hi-Shear Corp. (Torrance, Calif.).

For faying-surface applications, the selected coating materials should possess specific physical properties within certain ranges. The cured coating material has a Shore A hardness between about 30 and about 70. The coating material has an average permeance of about 0.3 perm to about 1.5 perms, after curing, measured using ASTM standard test method procedure E 96. Coating materials having a permeance from about 0.9 perm to about 1.5 perms are preferred.

Although the preferred polymers to use for this invention are polyurethanes, any polymer which can be formulated to give a semi-permeable soft flexible material with the correct physical properties to show adequate solvent resistance, temperature resistance, etc., as described above can be used. Satisfactory useful polymer types in addition to the polyurethanes include polyesters, epoxies, acrylics, silicones, natural and synthetic rubbers, polybutadienes and certain vinyl materials.

The final mixed product is applied to the component's substrate by a suitable technique such as brushing, spraying, drawing down a film, troweling etc. As stated above spraying is usually the preferred method of application. Just before the coating material is applied to a surface, the two parts of the coating material are delivered through individual fluid lines to a mixing device or chamber that is located within the spray gun or directly before the spray tip, which in the preferred case occurs in a metered spray nozzle orifice. It is very important that the right mixing ratio is obtained, otherwise defects in the coating material will develop. Thus, both sides must have balanced viscosities in order to be sprayed on ratio. Still, it is possible to apply some two-component products by using a brush, spatula, or roller.

The coating material thickness achievable by the present invention may vary according to the preferred end-result characteristics of the coated or pre-sealed component and the coating material itself. Preferably, the first or base coating material thickness ranges from about 0.004 inch to about 0.010 inch. The optional second or pressure sensitive adhesive (PSA) coating material thickness, if any, preferably ranges from about 0.0005 inch to about 0.0015 inch. The coating material thicknesses, as cured for either coating material, are substantially the same as the as-applied material thicknesses. One hundred percent polyurethane coatings are solvent free and have lower toxicity levels than the epoxies. 100%-solids formulations, such as the Hi-Kote F/S™ coating material, are solvent-free. The phrase '100% solids' refers to the lack of solvents contained in the coating material formulation. The 'before' and 'after' thickness of the 100%-solids coating material remains the same—whether wet or dry—because there are no solvents to evaporate. Furthermore, most 100%-solids coating materials have the advantage of additional material thickness that helps to increase their physical properties and chemical resistance.

In accordance with one embodiment of the invention, two coating material layers that are the same or different may be applied to the component. Further, it is most preferred if the optional second coating alone is encapsulated. The coating is encapsulated according to known encapsulation techniques. Encapsulation is a process whereby one substance, A, is dispersed in a medium in which this first substance is not soluble. As a high-speed stirring and shearing action is applied to disperse the substance A into a fine, colloidal particle, a second substance, B, is added which may be in a monomeric form. This second substance B is then polymerized, while still undergoing the high-speed stirring. This allows substance A to be encapsulated with the second substance, polymer B. Alternatively, substance A may be obtained in a fine particulate form and added to a solution of substance B, which coats the particulates of substance A. The resultant mixture is blown into an evacuated chamber. The solvent used in preparing the solution containing substance B is then removed under vacuum causing the encapsulated particles to precipitate and collect on the bottom of the chamber.

The encapsulated coating may be delivered to the component's surface by any acceptable method known in the field of spray coating materials. An encapsulated coating, when dispersed in an aqueous or non-aqueous medium, can be sprayed onto the substrate. When the non-solvent carrier evaporates away or dries out, the encapsulated particles are left behind. Alternatively, the encapsulated particles can be electrostatically sprayed onto the substrate surface. It is further contemplated that the second coating material preferably uses micro-suspension bead-technology similar to the known technology in the laser jet ink field. In this way, the second coating applied to the once-coated component preferably bursts under compressive forces generated during the assembly of the components to elicit an adhesively-bonded interface.

It is contemplated that this microsphere or bead-like delivery system can be used to deliver various types of useful initiators or catalysts to an aircraft structural component. Such initiators may be in any state and may be Friedel-Crafts ionic catalysts such as, but not limited to metal halides, acids, amines, boron trifluoride, boron trifluoride-etherate, etc. The catalyst chosen is preferably matched to the aging/curing requirements of each particular application.

For handling purposes, it is preferred that the coated or pre-sealed component surface be relatively tack-free. This requires that the coating material be cured using either a room or elevated temperature treatment, pressure treating, or irradiation, etc. Preferably, a coating material is allowed to rest at room temperature on the component surface and become tack-free after a suitable time, e.g. from about 2 hours to about 4 hours. Still further, it is contemplated that the second, encapsulated coating is delivered to the once-coated component and cured after a short time; from about 10 minutes to about 30 minutes.

In addition, to assist in handling the coated or pre-sealed component, a releasable paper or film may be placed over the coating(s) for protection. The film preferably is designed to release from the coating material's surface without disturbing the coating material(s) or its surface. However, it is contemplated that the release paper could activate the coating material it covers upon its removal therefrom. It is further contemplated that the releasable film itself could be coated with one or more coating materials that are then transferred to the component's surface being treated, followed by an optional curing protocol. The releasable film is then removed from the component, leaving the cured film adhered and cured to the component surface. Preferred films or release papers include glassine paper, fluorinated ethylene/propylene copolymer (FEP) film, kraft paper, Armalon film (fluorinated release film), IVEX Corp. release papers, such as CP-96A (a glossy coating on a 112# basis weight class paper) and IVEX LC-19 papers with CP-96A or IVEX LC-19 papers being particularly preferred.

The preferred selected temperature-curing regimen for the present invention is governed by the availability of the active catalyst/initiator and the reactivity of the catalyst/initiator with the monomer or organic compound comprising the first or base coating material. For example, benzoyl peroxide preferably heated to about 80° C. is a suitable polymerization initiator in a free radical polymerization of some vinyl monomers, such as styrene. However, benzoyl peroxide can also be used at lower temperature if higher pressures are provided. In addition, the selected catalyst for the optional second coating material may be an active catalyst; i.e. decomposable at room temperature, such as liquid peroxide in the presence of a tertiary amine. However, it is often necessary to allow such reactive monomers or others such as adhesives (low molecular weight polymers) to be mixed and applied to a substrate in position before it is subjected to a further reaction, such as polymerization, curing, bonding, etc. to another adhesive surface. It is therefore preferred to mix all components in a carrier medium to achieve a relatively homogeneous state prior to placement on a substrate. This applies to monomers with catalysts and also adhesive films applied for subsequent bonding. In this way the coating materials are applied such that no chemical action occurs until desired through applying, for example, a temperature or pressure change. In other words, the active materials to be reacted are "protected" from reacting prematurely. Therefore, in one particularly preferred embodiment of the present invention all "active" species are provided in an inert medium, but available for use on demand, even at room temperature.

Due to the exothermic nature of the reaction between polyol and isocyanate, polyurethane coatings can cure at almost any ambient, room temperature. This means that polyurethane coatings can be applied even during the cold months of the year. In comparison, epoxy coatings usually require elevated temperature environments above +50° F. (+10° C.). In the case of the preferred coating, Hi-Kote F/S™, the coating achieves an initial cure within about 5 to 15 minutes at room temperature, ambient conditions and is ready for handling in about two hours. Thus, fast-setting, one-coat polyurethanes have a much faster turn around time than epoxy systems. Epoxy coatings generally take seven to ten days to fully cure and to allow the solvents to evaporate. Some epoxy systems require force or elevated temperature curing protocols.

In addition, according to the present invention, by obviating the application and use of a wet, polysulfide sealant at faying surfaces during aircraft component assembly and, instead, pre-treating by pre-sealing or "pre-coating" the components with protective, tack-free coatings, improved tack-free surfaces are produced. Such surfaces enable the components to be handled more efficiently without the mess during processing and assembled in an automated manner thus greatly reducing production cost and cycle time.

Exemplary embodiments of the present invention relate to the preparation of aluminum-alloy, aircraft structural components and the following discussion will emphasize such articles. The use of the invention is not limited to components such as aircraft wing and fuselage skin panels, hinges, doors, etc., and instead is more broadly applicable. Nor are the materials used in these components limited to aluminum or aluminum-alloy materials. However, its use in aircraft structural components offers particularly significant advantages. The procedures of the present invention in no way inhibit the optimum performance of the alloy components. To the contrary, the present methods allow the components to maintain their optimum mechanical and metallurgical properties while providing equivalent and or improved levels of corrosion protection and pressurizations without the disadvantages associated with the wet-sealant approach.

As used herein, "aluminum-alloy" or "aluminum-base" means that the alloy has more than 50 percent by weight aluminum but less than 100 percent by weight of aluminum. Typically, the aluminum-base alloy has from about 85 to about 98 percent by weight of aluminum, with the balance being alloying elements, and a minor amount of impurity. Alloying elements are added in precisely controlled amounts to predictably modify the properties of the aluminum alloy. Alloying elements that are added to aluminum in combination to modify its properties include, for example, magnesium, copper, and zinc, as well as other elements.

Exemplary aluminum-alloy components are shown in FIGS. 1*a*-1*g*. FIG. 1*a* shows an aircraft wing panel assembly 1 prior to affixing the aluminum-alloy wing panel skins. The wing panel assembly 1 comprises hardware shown in enlarged FIGS. 1*b*-1*f*. FIG. 1*b* shows a stringer 2 attached to wing panel skin 7. FIG. 1*c* depicts a spar cap 3 attached to wing panel skin 7. FIG. 1*d* shows an angled shear clip 4 in position between stringers 2. FIG. 1*e* shows a butterfly clip 5 in position adjoining a stringer 2 and a shear clip 4. FIG. 1*f* shows a center spar clip 6 affixed to a section of wing panel skin 7. Finally, FIG. 1*g* depicts a section of fuselage structure showing framing 8 affixed to fuselage skin 7. These components preferably have their faying surfaces pre-sealed or "pre-coated" following the completion of their normal fabrication cycle, but prior to final assembly. Large sections of aluminum-alloy materials also could be pre-coated in a similar pre-coating or pre-sealing fashion during or even after final assembly.

In one case of interest, the aluminum-alloy substrate precursor is heat-treatable. For aircraft structural components having faying surfaces such as wing and fuselage skin panels, stiffeners, frames, doors, hinges, etc., it is preferred that such components would have their faying surfaces "pre-coated" following the completion of their normal fabrication cycle but prior to final assembly, although coating of large sections of aluminum-alloy components also could be pre-coated during or after final assembly. The component such as a wing skin panel or wing skin panel stiffener such as a stringer is first fabricated to a desired shape. The alloying elements are selected such that the fabricated shape may be processed to have a relatively soft state, preferably by heating it to an elevated temperature for a period of time and thereafter quenching it to a lower temperature. This process is termed "solution heat-treating" or "annealing." In the solution heat-treating/annealing process, solute elements are dissolved into the alloy matrix (i.e., solution-treating) and retained in solution by the rapid quenching, and the matrix itself is simultaneously annealed.

After the component is solution-treated/annealed, it may be further processed to increase its strength several fold to have desired high-strength properties. Such further processing, typically by a precipitation-hardening/aging process, may be accomplished either by heating to an elevated temperature for a period of time (termed artificial-aging) or by holding at room temperature for a longer period of time (termed natural-aging). The 7150 alloy is a specific, artificially-aged, aluminum-base alloy of particular interest for aircraft structural applications. The 7150 alloy has a composition of about 2.2 percent by weight copper, about 2.3 percent by weight magnesium, 6.4 percent by weight zinc, about 0.12 percent by weight zirconium and balance of aluminum plus minor impurities. Other suitable alloys include, but are not limited to, 2000, 4000, 6000, and 7000 series heat-treatable aluminum alloys. The 7150 alloy is available commercially from several aluminum companies, including ALCOA, Reynolds, and Kaiser.

After the component is fabricated to the desired shape, the 7150 alloy is fully solution-treated/annealed to have an ultimate tensile strength of about 42,000 pounds per square inch (psi) and yield strength of about 24,000 psi with an ultimate elongation of about 12% or as otherwise required. This state is usually obtained following the component's fabrication processing including machining, forging, or otherwise forming the component into the desired shape. This condition is termed the "untreated state" herein, as it precedes the final aging/precipitation heat-treatment cycle required to optimize the strength and other properties of the material. The component may be subjected to multiple forming operations and is periodically re-annealed as needed, prior to the strengthening, precipitation heat-treatment process. After forming (and optionally re-annealing), the 7150 alloy may be heat-treated at a temperature of about 250° F. for about 24 hours.

It is understood that additional, optional steps may be inserted into the above-described preferred methods. In one particularly preferred optional step, the component is initially optionally chemically-etched, grit-blasted or otherwise processed to roughen its surface, and thereafter anodized in chromic-acid solution. Chromic-acid solution is available commercially or prepared by dissolving chromium trioxide in water. The chromic-acid solution is preferably of a concentration of about 4 percent chromate in water, and at a temperature of from about 90° F. to about 100° F. The article or component to be anodized becomes the anode in the mildly agitated chromic-acid solution at an applied DC voltage of from about 18 volts to about 22 volts. Anodizing is preferably continued for from about 30 minutes to about 40 minutes, but shorter times were also found to be sufficient. The anodizing operation produces a strongly adherent oxide surface layer from about 0.0001 inches to about 0.0003 inches thick on the aluminum-alloy article, which surface layer promotes the adherence of the subsequently applied first organic coating.

Components other than aluminum-alloy components may be used in accordance with the invention. Specifically, titanium, titanium-alloy, steel, or composite components may be used. These components are formed as known in the art of the respective materials.

After the components have completed their normal fabrication cycle, the first or base coating material described above is preferably provided in about 100% low-viscosity, solid-solution or "neat" material so that it may be readily and evenly applied. The coating is subsequently cured to effect structural changes within the organic coating, typically cross-linking organic molecules to improve the adhesion and cohesion of the coating.

Figure 2:
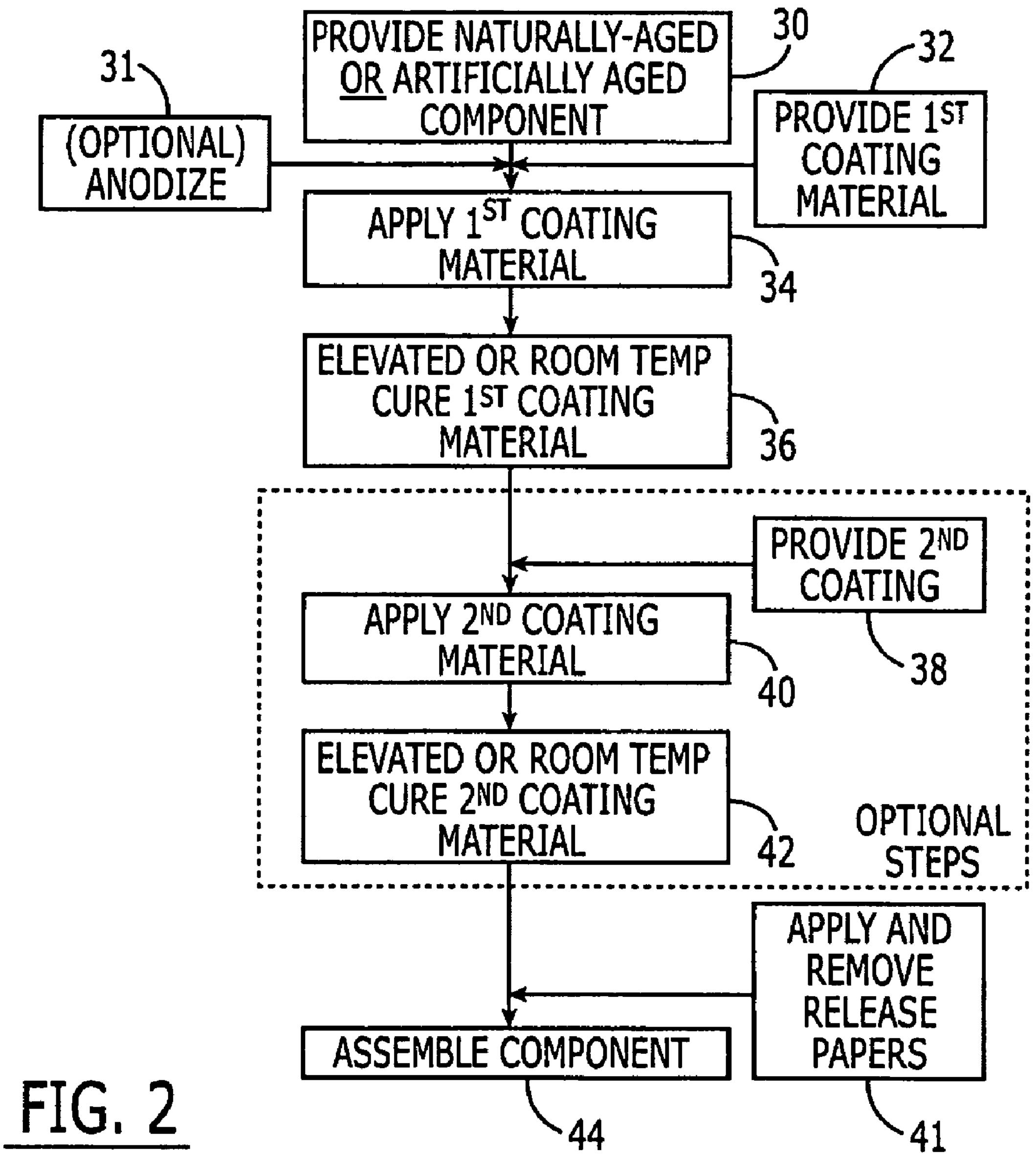

FIG. 2 shows one preferred method of the present invention. In this preferred embodiment, either a naturally-aged or an artificially-aged (and optionally anodized 31), aluminum-alloy component 30 and the first coating material 32 are provided with the coating material applied thereto 34. The coating material is then cured 36 either at room temperature or at an elevated temperature. The coating process is optionally repeated with a second coating material by providing 38 the second coating material, applying 40 the coating material and curing the second coating material 42. Optionally, release papers may be applied 41 to either or both of the coating layers during handling or removed upon assembly. The component is then positioned and assembled 44.

Optionally, variations in the surface preparation or cleaning procedures, such as the optional anodizing process step, may be utilized depending upon the component's substrate material.

As previously mentioned, the pre-sealed components may be subjected to either room or elevated temperature conditions in order to cure one or more of the coating material layers. Preferred methods for simultaneously heat treating of the structural components and curing of the sealant material are found in U.S. Pat. Nos. 6,475,610 and 6,610,394.

The component assembly step reflects one of the advantages of the present invention. If the coating materials were not applied to the components before assembly, it would be necessary to place a viscous, wet-sealant material onto the faying surfaces in order to coat the mating or faying surfaces before the mating components are either joined, assembled, or installed. The wet-sealant material is potentially toxic to workers, messy, and difficult to work with, and necessitates extensive cleanup (of both tools and the exposed surfaces of the resulting aircraft section) with and disposal of caustic chemical solutions after components are assembled. Moreover, it has been observed that the presence of residual, wet-sealant materials inhibit the adhesion of later-applied paints or other top coats onto the assembled components. The present coating approach overcomes these problems. As a result of the present invention, the application of wet-sealant material is not needed or used during installation and consequent assembly of the structural components.

Further, it is highly advantageous to apply the protective fay-surface coating material of the present invention to aircraft structural components to facilitate automated part assembly and inspection. Since the parts are pre-coated, there can be no chance of human error in or the omission of the proper treatment or application of the sealant material to the faying surfaces of the components. The present invention further enhances the integrity, consistency, and performance of aircraft's faying surfaces, as well as improving existing part storage, general handling, installation, and assembly systems. In short, the present invention allows for the pre-coated or pre-sealed components to retain all mechanical and metallurgical properties, as well as the required degree of corrosion protection, without any of the disadvantages of the conventional wet-sealant corrosion treatments.

Still further, these coatings are more environmentally friendly and generally safer to use due to their decreased levels of flammability and health risk. Also, on a cost-per-mil of thickness, they are very cost-effective. Finally, most 100%-solids coating materials have the advantage of additional material thickness that helps to increase their physical properties and chemical resistance. 100%-polyurethane coating materials feature a unique "self-inspecting" property; they fail almost immediately if they are incorrectly applied or if there is a problem with the surface preparation or the mixing ratio. Thus, polyurethane coating materials, such as Hi-Kote F/S™, can be inspected immediately after application and any defects in the coating will be visible.

EXAMPLES

Moisture permeability testing was conducted in accordance with the standardized ASTM E 96 test procedure to determine moisture permeability characteristics of both the wet and proposed, pre-sealing coating materials.

Permeability tests for moisture transmission were performed as specified in order to establish a comparative database. While these results are not crucial to this evaluation and are, in general, difficult to relate to real world situations, they nonetheless provide descriptive information regarding the sealant material characteristics and performance. Table 2 below presents the moisture permeability results of various, selected sealant materials per ASTM E 96, method A (English units). This test evaluation was intended to quantify the performance of the various sealant materials in order to provide a reference for future qualifications and approvals of sealant materials.

What is claimed is:

1. A method for preparing a pre-coated component comprising the steps of:

providing a metallic or composite component precursor;

providing a curable organic coating material having a non-volatile portion that is organic and is curable, wherein the curable organic coating material is encapsulated;

coating the component precursor with the organic coating material; and curing the organic coating material, said coating having an average permeance of from about 0.3 perm to about 1.5 perms.

2. The method of claim 1, wherein the precursor is metallic and further comprising the step of heat-treating the metallic precursor simultaneously with curing the organic coating material.

3. The method of claim 2, wherein the metallic precursor is an aluminum-alloy material.

4. The method of claim 1, wherein the step of providing a precursor includes providing an aircraft component selected from the group consisting of wing and fuselage skin panels, stiffeners, frames, and hinges.

5. The method of claim 1, further comprising the step of providing and applying a second coating to the once-coated component.

TABLE 2

PERMEABILITY RESULTS FOR VARIOUS SEALANT COMPOUNDS

| SEALANT MATERIAL | 168 HOUR MASS INCREASE (GRAINS) | MASS RATE CHANGE (GRAINS/HR) | WATER VAPOR TRANSMISSION (GRAINS/HR/FT$^2$) | PERMEANCE (PERMS) | SPECIMEN THICKNESS (INCH) | AVERAGE PERMEABILITY (PERM-INCH) |
|---|---|---|---|---|---|---|
| PR 1422B2 | 3.225 | 0.0192 | 0.483 | 0.350 | 0.029 | 0.010 |
| PS 870C48 | 9.891 | 0.0589 | 1.481 | 1.075 | 0.005 | 0.005 |
| PR 1775C48 | 3.117 | 0.0186 | 0.467 | 0.339 | 0.022 | 0.007 |
| PR 1775C48 | 6.033 | 0.0359 | 0.903 | 0.655 | 0.006 | 0.004 |
| PS 870C48 | 8.440 | 0.0502 | 1.264 | 0.917 | 0.006 | 0.006 |
| Hi-Kote F/S ™, Chromated | 13.239 | 0.0788 | 1.982 | 1.438 | 0.011 | 0.016 |
| Hi-Kote F/S ™, Non-Chromated | 8.672 | 0.0516 | 1.298 | 0.942 | 0.022 | 0.021 |

The results demonstrate that several polymeric materials that behave favorably as fay-surface sealant materials exhibit significant, quantifiable moisture permeability and permeance properties. Particularly, material formulations that have been demonstrated to be exceptional fay-surface sealant materials in practice, such as the Hi-Kote F/S™ sealant materials, have measurable permeance characteristics in the range of about 0.9 perm to about 1.5 perms (1 grain water vapor per ft$^2$ per hour per inch Hg). This result is surprising in light of prior assumptions that overall quality and performance of the materials when used as fay-surface sealant would be dependent upon their seemingly impermeability nature. In addition, the slight permeance or semi-permeable characteristic of the sealant material is beneficial in that swelling of the coating material layer enhances the sealing characteristics of the faying-surface coating.

Many other modifications and variations of the present invention are possible to the skilled practitioner in the field in light of the teachings herein. It is therefore understood that, within the scope of the claims, the present invention can be practiced other than as herein specifically described.

6. The method of claim 1, wherein the curable organic coating material comprises a phenolic resin.

7. The method of claim 1, wherein the curable organic coating material is selected from the group consisting of polyurethanes, polyvinyl chlorides, silicones, epoxides, acrylates, polyimides and phenolics.

8. The method of claim 1, further comprising the step of providing a substantially uniform coating material deposited to a thickness of from about 0.004 inch to about 0.010 inch.

9. The method of claim 1, wherein the coating has an average permeance of from about 0.9 perm to about 1.5 perms.

10. The method of claim 1, wherein the coating material has an average Shore A hardness of from 30 to 70.

11. The method of claim 1, wherein the coating material has a chromate content from about 3 wt % to about 6 wt %.

12. A method for preparing a pre-coated component comprising the steps of:

providing a metallic or composite component precursor;

providing a curable organic coating material having a non-volatile portion that is organic and is curable, wherein the organic coating comprises a non-leachable anti-microbial additive;

coating the component precursor with the organic coating material; and curing the organic coating material, said coating having an average permeance of from about 0.3 perm to about 1.5 perms.

13. A method for treating a metallic or composite component having a faying surface comprising the steps of:

providing a metallic or composite component;

providing a first coating material;

applying the first coating material to the component;

providing a second coating material to the coated component, wherein the second coating material is an encapsulated coating;

applying the second coating material to the component; and heat-treating the component;

wherein at least one of the first and second coating materials has a permeance of about 0.3 perm to about 1.5 perms.

14. The method of claim 13, wherein the component is heat-treated after application of the first coating material but before application of the second coating material.

15. The method of claim 13, wherein the component is heat-treated after application of the second coating material.

16. The method of claim 13, wherein the component if formed from an aluminum-alloy material.

17. The method of claim 13, wherein the step of providing a first coating material includes the step of providing coating materials selected from the group consisting of phenolics, epoxies, urethanes, silicones, novolaks, acrylates, and melamines.

18. The method of claim 13, wherein the step of providing an encapsulated coating includes the step of providing a second coating material selected from the group consisting of phenolics, epoxies, urethanes, novolaks, melamines, acrylates, and silicones.

19. The method of claim 13, further comprising the steps of providing a releasable film; and applying the releasable film to the component to cover the second coating material.

20. The method of claim 13, wherein the at least one coating material has an average permeance of from about 0.9 perm to about 1.5 perms.

21. The method of claim 13, wherein the coating materials have an average Shore A hardness of from 30 to 70.

22. The method of claim 13, wherein at least one of the coating materials has a chromate content from about 3 wt % to about 6 wt %.

23. The method of claim 13, further comprising the step of positioning the twice-coated component into a final assembly position.

24. The method of claim 13, further comprising the step of providing a force to the twice-coated component sufficient to liberate the encapsulations of the second coating material.

25. The method of claim 24, wherein the step of providing a force to the component includes providing a pressure in the range of from about 1500 psi to about 2500 psi.

26. The method of claim 24, wherein the step of providing a force to the component is a compressive force in the range of from about 1500 psi to about 2500 psi.

27. The method for treating a metallic or composite component having a faying surface comprising the steps of:

providing a metallic or composite component;

providing a first coating material;

applying the first coating material to the component;

providing a second coating material to the coated component;

applying the second coating material to the component; and heat-treating the component;

wherein at least one of the first and second coating materials has a permeance of about 0.3 perm to about 1.5 perms, and wherein at least one of the first and second coating materials comprises a non-leachable anti-microbial additive.

* * * * *